(12) United States Patent
Alfarano et al.

(10) Patent No.: US 12,093,560 B2
(45) Date of Patent: Sep. 17, 2024

(54) METHOD FOR INTRODUCING PERSONALIZATION DATA IN NON VOLATILE MEMORIES OF A PLURALITY OF INTEGRATED CIRCUITS, IN PARTICULAR IN INTEGRATED CIRCUIT CARDS, CORRESPONDING SYSTEM AND COMPUTER PROGRAM PRODUCT

(71) Applicant: STMicroelectronics S.r.l., Agrate Brianza (IT)

(72) Inventors: Marco Alfarano, Naples (IT); Sofia Massascusa, Caserta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 18/320,414

(22) Filed: May 19, 2023

(65) Prior Publication Data
US 2023/0384969 A1 Nov. 30, 2023

(30) Foreign Application Priority Data

May 26, 2022 (IT) .................. 102022000011084

(51) Int. Cl.
*G06F 3/06* (2006.01)
(52) U.S. Cl.
CPC .......... *G06F 3/0655* (2013.01); *G06F 3/0604* (2013.01); *G06F 3/0673* (2013.01); *G06F 3/0679* (2013.01)
(58) Field of Classification Search
CPC .... G06F 3/0655; G06F 3/0604; G06F 3/0673; G06F 3/0679

(Continued)

(56) References Cited

U.S. PATENT DOCUMENTS 6,014,748 A * 1/2000 Tushie ................. G06Q 20/367
257/679
2017/0308300 A1* 10/2017 Lee .......................... G06F 3/061
(Continued)

FOREIGN PATENT DOCUMENTS

EP 3547729 A1 10/2019

OTHER PUBLICATIONS

3GPP, "Digital cellular telecommunications system (Phase 2+) (GSM); Test specification for Subscriber Identity Module (SIM) Application Programming Interface (API) for Java Card," (3GPP TS 51.013 version 17.0.0 Release 17) ETSI TS 151 013 V17.0.0 (Apr. 2022), 491 pages.

(Continued)

*Primary Examiner* — Than Nguyen
(74) *Attorney, Agent, or Firm* — Slater Matsil, LLP

(57) ABSTRACT

In embodiments, a method is provided that includes writing a static data image in an invariant part of a non-volatile memory of an integrated circuit used to store an operating system; writing a set of personalization data in the static data image representing data specific to the integrated circuit; storing a subset of the set of personalization data in a reserved area of the non-volatile memory by reserving the reserved area and storing commands for writing the set of personalization data by an application or the operating system; converting the commands with a known code to obtain an inner command script, the inner script including the commands as encoded; storing the inner command script in the reserved area of the non-volatile memory; decoding and executing the inner command script to obtain the commands during an activation of the integrated circuit; and executing the commands by the integrated circuit.

20 Claims, 5 Drawing Sheets

(58) Field of Classification Search
USPC .......................................................... 711/154
See application file for complete search history.

(56) References Cited

U.S. PATENT DOCUMENTS

2019/0306697 A1* 10/2019 Veneroso ................ H04W 4/50
2021/0096178 A1    4/2021 Alfarano et al.

OTHER PUBLICATIONS

GlobalPlatform Technology, Card Specification Version 2.3.1, Document Reference: GPC_SPE_034, Mar. 2018, 334 pages.

* cited by examiner

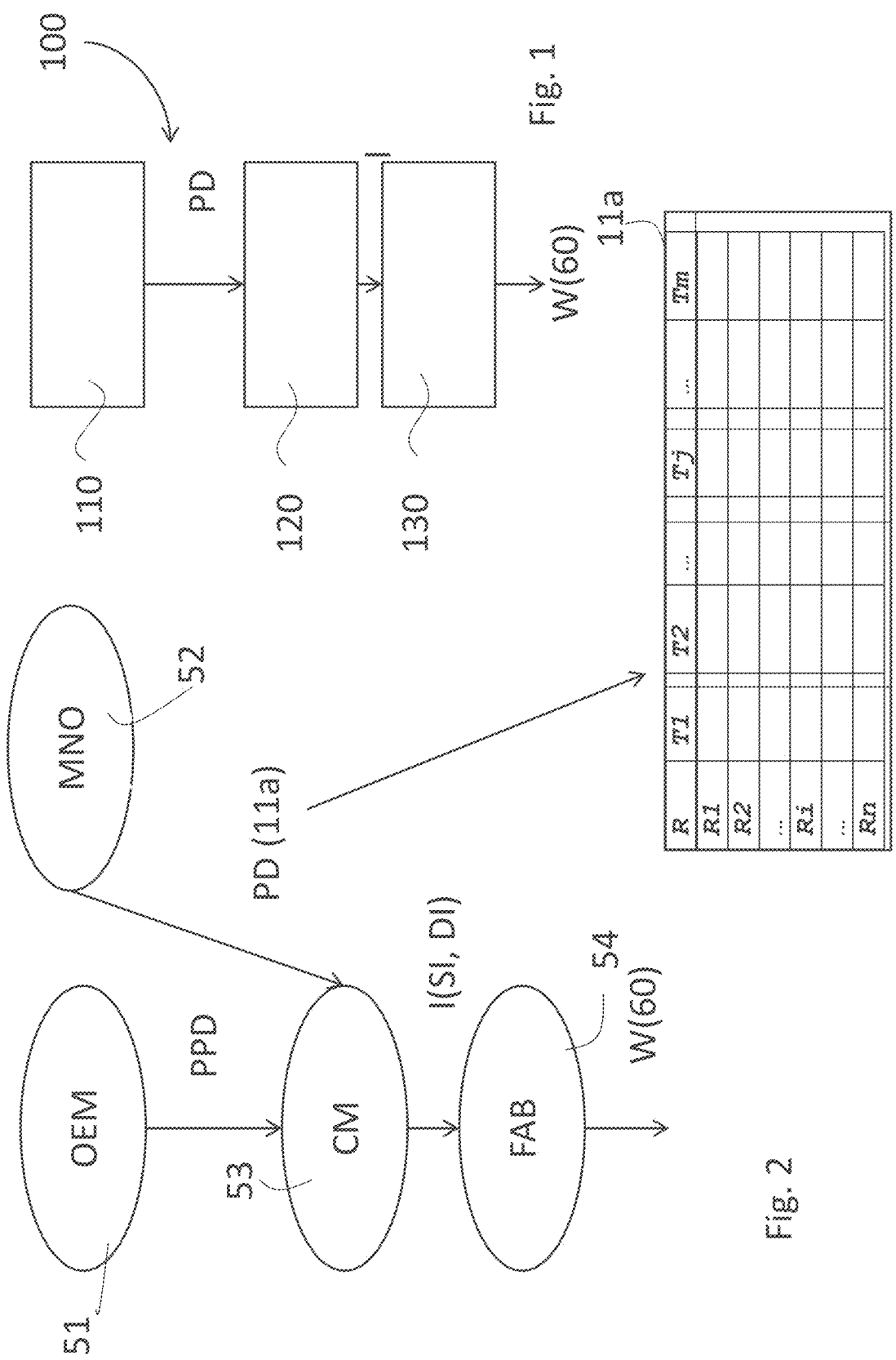

METHOD FOR INTRODUCING PERSONALIZATION DATA IN NON VOLATILE MEMORIES OF A PLURALITY OF INTEGRATED CIRCUITS, IN PARTICULAR IN INTEGRATED CIRCUIT CARDS, CORRESPONDING SYSTEM AND COMPUTER PROGRAM PRODUCT

CROSS-REFERENCE TO RELATED APPLICATIONS

This application claims priority to Italian Application No. 102022000011084, filed on May 26, 2022, which application is incorporated by reference herein in its entirety.

TECHNICAL FIELD

The present disclosure generally relates to memory and, in particular embodiments, to a method for introducing personalization data in non-volatile memories of a plurality of integrated circuits, integrated circuit cards, corresponding systems, and computer program products.

BACKGROUND

Embodiments of the present disclosure relate to solutions for introducing personalization data in non-volatile memories of a plurality of integrated circuits including secure elements, by storing Token Non-Volatile Memory Images, writing in the non-volatile memory of a given integrated circuit a static data image, corresponding to an invariant part of non-volatile memory common to the plurality of integrated circuit cards including an operating system, and writing in the static data image a set of personalization data representing data specific of the given integrated circuit card, the set of personalization data including at least a subset of unpredictable personalization data which storing location or form of coding in the static data image is not known.

Embodiments of the present disclosure relate in particular to secure elements, such as embedded secure elements and integrated circuit cards, produced with WLCSP (Wafer Level Chip Scale Packaging) techniques, in particular, integrated circuits for UICC (Universal Integrated Circuit Card) and more in particular to embedded UICC (eUICC).

The solution refers to generating batches of integrated circuits including secure elements. With the expression 'secure element' is here referred to an integrated circuit, i.e., a chip, that is by design protected from unauthorized access and used to run a limited set of applications, as well as store confidential and cryptographic data here included, in particular, are considered secure elements UICC, eSE (embedded Secure Element), eUICC, iUICC (integrated UICC), SSP (Smart Secure Platform) architecture based. Each secure element, in particular, an integrated circuit card such as eUICC, in the batch may be personalized by introducing personalization data (sometimes referred to as "personal data"), e.g., encryption keys or identifiers, specific for each integrated circuit card.

Under this view, WLCSP, Wafer Level Chip Scale Packaging, also referred to as Wafer-Level Packaging (WLP) or Chip Scale Packaging (CSP) is a known technology for packaging an integrated circuit while still part of the wafer. Such wafer-level processing contrasts with conventional methods of slicing the wafer into individual circuits (e.g., a chip or a die) and then packaging them. WLCSP is truly a chip-scale package since the resulting package is the same size as the die. A WLCSP package usually includes the integrated circuit die, a possible redistribution Layer (RDL), and solder balls or bumps. The redistribution Layer is required to route from peripherally located bond wire pads to a grid array of CSP pad locations. WLCSP can be a good choice for small pin count devices as a way to optimize area and cost. Alternatively, the integrated circuit can be laid out with bond-wire I/O pads on the periphery of the integrated circuit. A redistribution Layer can then be applied to the integrated circuit to redistribute the CSP ball pads to the desired grid spacing.

In the field of secure elements for some applications such as telecom, banking, identification, and authentication, which mainly are introduced in integrated circuit cards, the integrated circuit circuits cannot be identical: they have to be diversified by a personalization operation to include a respective unique identifier or encryption keys and other personalization data.

Usually, to produce an eUICC (embedded Universal Integrated Circuit Card) the OEM (Original Equipment Manufacturer) or the MNO (Mobile Network Operator) requires the EUM (eUICC Manufacturer) a batch of integrated circuit circuits for mobile connectivity.

In FIG. 1 it is shown a flow diagram example of a method 100 for introducing personalization data in non-volatile memories of a plurality of integrated circuits, specifically eUICCs produced by WLCSP.

In FIG. 2 are shown schematics of an embodiment 50 of a system for introducing personalization data in non-volatile memories of a plurality of integrated circuits, which can implement method 100.

Thus, with reference to FIGS. 1 and 2, in the first step 110 a Mobile Network Operator 52 sends to a Chip Manufacturer 53 an input file PD with personalization data, for instance, a personalization data table 11a as shown in FIG. 2, to generate personalization data (e.g. IMSI (International Mobile Subscriber Identity), ICCID (Integrated Circuit Card Identification Number), RSA/ECC certificate, encryption keys and other identifiers, certificates or keys specific of a specific card/chip). The Chip Manufacturer 53, which usually corresponds to the card vendor for integrated cards like the eUICC, may also receive from an Equipment User Manufacturer 51, i.e., the entity which has requested the plurality of integrated circuits, or the same MNO 52, pre-personalization data PPD, which includes, for instance, third party applets, bundles, software profiles and other data which are common to the plurality of integrated circuits and form a static image SI, i.e. a data image, to be stored in the non-volatile memory of the integrated circuit.

The data table 11a, as shown in FIG. 2, may include a plurality of records $R_1 \ldots R_n$, corresponding to the rows of table 11a. Each i-th record $R_i$ corresponds to a determined i-th integrated circuit card 60 in a set or batch including a number n of card 60 to be personalized.

Each column of the personalization data table 11a includes a personalization field $T_1 \ldots T_j \ldots T_m$, where m is the number of fields in table 11a and $j$ is the integer index of the personalization field, in which a different type of personalization value is stored. In some fields among the personalization fields $T_1 \ldots T_m$ can be stored the Crypto Keys, in other fields the PIN numbers, the unique Id, and other personalization data Then Chip Manufacturer 53 prepares in step 120 a batch or batches of non-volatile memory images I, containing static images SI, and personalization images DI to be sent to the semiconductor fabrication plant 54 producing the integrated circuits.

The semiconductor fabrication plant 54 thus prepares in step 130 integrated circuits 60, which are in this embodiment on wafers W, with personalized integrated circuit circuits ready to be cut and soldered/embedded as eUICC in a device such as a SIM in a smartphone or tablet. Such integrated circuits 60 in general include at least a non-volatile memory, in which data images can be stored for programming the integrated circuit, and usually also a processing unit, as in the case of integrated circuit cards for banking and communication application, e.g. UICC and eUICC.

The WLCSP process applied in the last step 130 described above has some constraints in providing the non-volatile memory images, which have to be provided as follows one Static Image SI, corresponding to an invariant part of the non-volatile memory; a plurality of personalization images DI, each one corresponding to a final integrated circuit, i.e., chip or die. Also, there should not be an overlap in the non-volatile memory between the Static Image and the respective personalization images in each circuit.

Personalization by means of token methods may be using a subset of personalization data, which are transformed according to unknown rules, in particular unknown to the Chip Manufacturer, i.e., they represent so-called Unpredictable Personalization Data. Those data, in a non-token-based personalization method, would be conveyed by administrative APDUs (Application Protocol Data Unit), or commands. The unpredictability of data transformation, from the generated data to ones stored within non-volatile memory, may happen in the case of third-party Applets or proprietary OS mechanisms.

In this case, a common scenario is that the Chip Manufacturer receives input files to generate the personalization data from the customer, e.g., OEMs, MNOs, Banks, Government, and Transport Companies. Subsequently, Chip Manufacturer generates personalization data. Then the Chip Manufacturer needs to produce Token Non-Volatile Memory (NVM) Images to be stored in a non-volatile memory of the secure element, in the example, an eUICC.

If the personalization data are Unpredictable Personalization Data, a problem may arise in that the Chip Manufacturer, i.e., the secure element maker, cannot convert some Personalization Data into values to be put into Memory Image areas because the conversion function used is not known.

Personalizing a secure element by means of APDUs and retrieving the memory image is not feasible due to time consumption, or not allowed by production processes.

This kind of product can be issued by other techniques than Token based, i.e., via administrative APDUs/commands, not feasible in the case of WLCSP (Wafer Level Chip Scale Packaging).

SUMMARY

On the basis of the foregoing description, the need is felt for solutions that overcome one or more of the previously outlined drawbacks.

According to one or more embodiments, such an object is achieved through methods having the features specifically set forth in the claims that follow. Embodiments moreover concern a related system for the personalization of integrated circuit cards circuit and a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

The claims are an integral part of the technical teaching of the disclosure provided herein.

As mentioned in the foregoing, the present disclosure provides solutions regarding a Method for introducing personalization data in non-volatile memories of a plurality of integrated circuit cards, in particular secure elements, in particular integrated circuit cards, by storing Token Non-Volatile Memory Images including writing in the non-volatile memory of a given integrated circuit a static data image, corresponding to an invariant part of non-volatile memory common to the plurality of integrated circuits including an operating system, and writing in the static data image a set of personalization data representing data specific of the given integrated circuit, wherein the method includes storing a subset of the set of personalization data in the non-volatile memories of a plurality of integrated circuits by reserving an area of the non-volatile memory for the subset of personalization data, storing commands, in particular APDU, configured to perform the writing of respective personalization data values in the subset of personalization data by corresponding applications or operative system stored in the integrated circuit, the storing commands including converting the commands with a known coding obtaining an inner command script including the commands encoded therein and storing the inner command script in the area of the non-volatile memory for the subset of personalization data, providing a decoding software circuit, in particular an application, which is configured to decode the inner command script obtaining the commands, in particular APDU, configured to perform the writing of personalization data values in the subset and to execute them, at a subsequent activation of the integrated circuit by the decoding software circuit decoding and executing the inner command script.

In variant embodiments, the providing a decoding software circuit includes storing in the non-volatile memory the decoding software circuit, in particular an application, which is configured to decode the inner command script obtaining the commands, in particular APDU, configured to perform the writing of personalization data values in the subset and to execute them.

In variant embodiments, the known coding is a Length Value coding (LV coding).

In variant embodiments, the method includes deleting the decoding software circuit configured to decode the inner command script obtaining the commands, in particular, APDU, configured to write personalization data values in the subset and to execute them, or the inner command script.

In variant embodiments, the subset of personalization data is a subset of unpredictable personalization data whose location or coding for storing in the static data image is unknown.

In variant embodiments, if the set of personalization data includes a further subset of predictable personalization data which storing location or coding form in the static data image is known, storing the predictable personalization data by a substitution technique, writing the predictable personalization data images in the static data image at the known locations and with the known coding form.

In variant embodiments, the method includes performing encryption, in particular, an AES encryption of the inner command script before storing it in the area of the non-volatile memory for the subset of personalization data; the software circuit is configured to decrypt the encryption, then to decode the decrypted inner command script and execute the corresponding commands.

In variant embodiments, a protection key of the encryption, particularly AES encryption, is supplied as predictable personalization data accessible from the software circuit.

In variant embodiments, Non-Volatile Memory (NVM) Images correspond to whole non-volatile memory images, SSP bundles, or integrated circuit card software profiles.

The present disclosure also provides solutions regarding a system for introducing personalization data in non-volatile memories of a plurality of integrated circuits, including a chip manufacturer and a factory, configured to present personalization data in non-volatile memories of a plurality of integrated circuits according to the method of any of the embodiments.

In variant embodiments, the factory is configured to produce the integrated circuits according to WLCSP (Wafer Level Chip Scale Packaging) techniques, performing the writing operation on integrated circuits on a wafer.

The present disclosure also provides solutions regarding a computer-program product that can be loaded into the memory of at least one processor. It includes portions of software code for implementing the method of any of the previous embodiments.

BRIEF DESCRIPTION OF THE DRAWINGS

Embodiments of the present disclosure will now be described with reference to the annexed drawings, which are provided purely by way of non-limiting examples and in which:

FIGS. 1 and 2 have already been described in the foregoing;

DETAILED DESCRIPTION OF ILLUSTRATIVE EMBODIMENTS

Figure 3B:
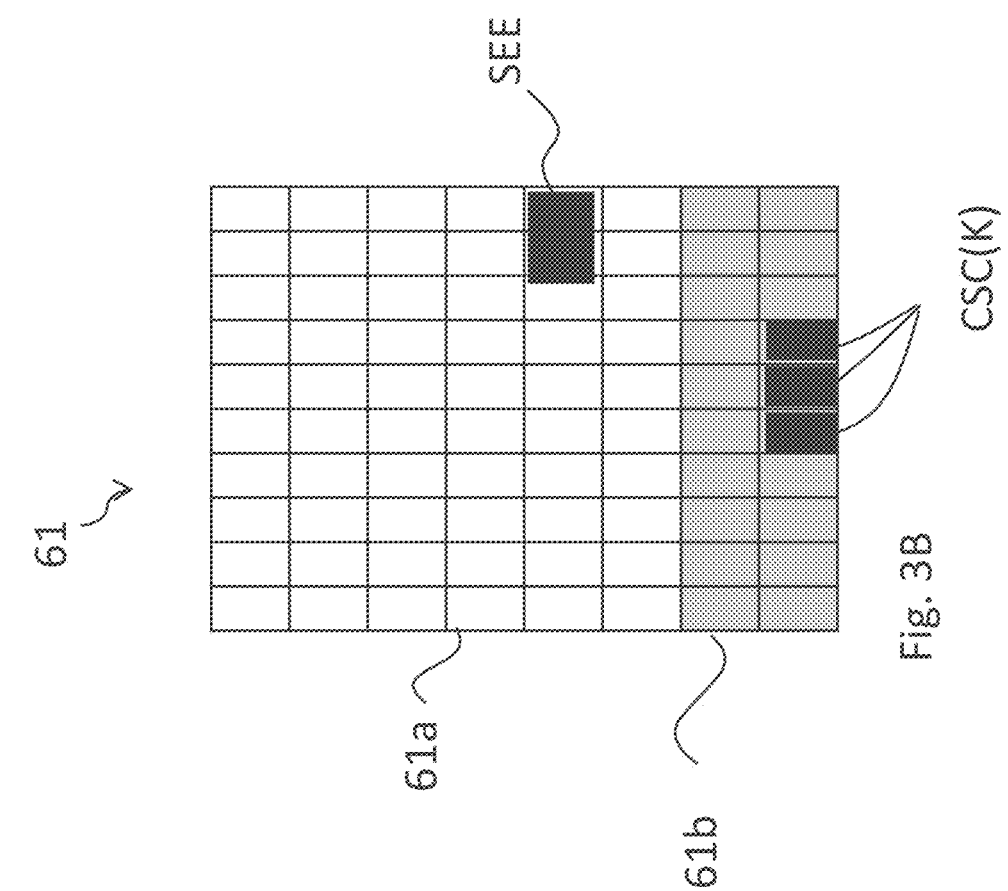
FIGS. 3A and 3B shows a non-volatile memory of the integrated circuit in different phases of an embodiment of the method described here.

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures parts, elements, or components which have already been described concerning FIGS. 1 and 2 are denoted by the same references previously used in such Figures; the description of such previously described elements will not be repeated in the following in order not to overburden the present detailed description.

The solution here described substantially regards a solution for introducing personalization data in non-volatile memories of a plurality of integrated circuit cards, in particular secure elements (e.g., integrated circuit cards) by storing Token Non-Volatile Memory (NVM) Images including writing in the non-volatile memory of a given integrated circuit a static data image, corresponding to an invariant part of non-volatile memory common to the plurality of integrated circuits including an operating system, and writing in the static data image a set of personalization data representing data specific to the given integrated circuit. The method includes storing a subset of the set of personalization data in the non-volatile memories of a plurality of integrated circuits by reserving an area of the non-volatile memory for the subset of personalization data, storing commands (e.g., APDU) configured to perform the writing of respective personalization data values in the subset by corresponding applications or operative systems stored in the integrated circuit.

In embodiments, storing commands includes converting the commands with a known coding obtaining an inner command script including the commands encoded therein, and storing the inner command script in the area of the non-volatile memory for the subset of the set of personalization data, providing a decoding software circuit (e.g., an application), which is configured to decode the inner command script obtaining the commands (e.g., APDU) configured to perform the writing of personalization data values in the subset and to execute them, at a subsequent activation of the integrated circuit by the decoding software circuit decoding and executing the inner command script (i.e., writing the personalization data in the non-volatile memory).

The subset of the set of personalization data includes only unpredictable personalization data (i.e., location or coding for storing in the non-volatile memory), particularly within the static data image, which is not known, and the set of personalization data may include only such unpredictable personalization data.

In variant embodiments, however, application of the solution here described to a set of personalization data including also predictable personalization data is not excluded, although the steps of storing by reserving an area of the non-volatile memory for the subset of personalization data, storing commands (e.g., APDU) configured to perform the writing of respective personalization data values in the subset by corresponding applications or operative system stored in the integrated circuit.

In embodiments, storing commands includes converting the commands with a known coding obtaining an inner command script including the commands encoded therein, and storing the inner command script in the area of the non-volatile memory for the subset of the set of personalization data, providing a decoding software circuit (e.g., an application). The decoding software circuit is configured to decode the inner command script to obtain the commands (APDU). The commands are used to perform the writing of personalization data values in the subset and to execute them, at a subsequent activation of the integrated circuit by the decoding software circuit decoding and executing the inner command script (i.e., writing the personalization data in the non-volatile memory storage, reserving an area of the non-volatile memory for the subset of personalization data being however only dedicated to the subset of unpredictable personalization data).

The predictable personalization data may be stored by the prior art methods or other methods, likely the most efficient.

Accordingly, the subset of the set of personalization data, which includes only unpredictable personalization data, may be a proper subset (e.g., the set of personalization data contains other personalization data). For example, predictable personalization data, besides the subset of personalization data, in particular unpredictable personalization data, or an improper subset. In embodiments, the set of personalization data does not contain other personalization data besides the subset of personalization data, particularly unpredictable personalization data (i.e. the set and subset are congruent).

Here an embodiment is described with reference to the diagram flow, representing method 200 of introducing personalization data in non-volatile memories of a plurality of integrated circuits including secure elements, in the example of an eUICC using Third Party applets, according to embodiments.

Method 200, according to embodiments, may include the following operations. In step 210 a first entity (e.g., customer or the Mobile Network Operator 52) sends to a second entity (e.g., the Chip Manufacturer 53), an input file including a set of personalization data, which includes a subset of unpredictable personalization data UPD and may include pre-personalization data PPD.

In the example, the set of personalization data includes also a subset of predictable personalization data PD (i.e., personalization data as those described with reference to FIG. 1), which memorization location in the data image SI is known. The unpredictable personalization data UPD are conveyed by sequences of commands, namely APDU, indicated with SC, which is configured to perform the writing of respective unpredictable input personalization data values (e.g. crypto keys, unique IDs), which are specifically indicated, as values, with K, by corresponding applications, not shown, stored in the integrated circuit card 60. In embodiments, this can be performed for instance by personalization processes using APDUs as described in the "GlobalPlatform Card Specification" for instance in the example in FIG. 7.3 of Version 2.3.1 (2018).

The sequence of commands SC may be a sequence of APDUs such as INSTALL [for personalization], SELECT, and STORE DATA, processed by the application identified by Application Identifier (AID), which transforms respective personalization data in the subset UPD. The APDUs, in a manner known per se, for example, as indicated above, have the corresponding application or the operative system access the personalization data values and store them through the operative system where it is deemed necessary by the application and with the required transformation (i.e., a form of coding).

In step 220, the Chip Manufacturer 53 prepares the static images SI of the cards. The memory images by way of non-limiting example may be represented by a non-volatile memory image (e.g., for performing a dump of such image in the memory), by an SSP bundle, an integrated circuit card (e.g., eUICC), or software profile.

If the predictable personalization data PD are present, then in a step 225 batch or batches of non-volatile memory images I, containing static images SI and personalization images DI obtained as described with reference to FIG. 1 are generated, to be sent to the semiconductor fabrication plant 54 producing the integrated circuits; the semiconductor fabrication plant 54 thus prepares in step 230 integrated circuits with secure elements (e.g., eUICC) 60', which are in this embodiment on wafers W, with personalized integrated circuit circuits ready to be cut and soldered/embedded as eUICC in a device such as a SIM in a smartphone or tablet. Such integrated circuits 60' in general include at least a non-volatile memory, in which data images can be stored for programming the integrated circuit, and usually also a processing unit, as in the case of integrated circuit cards for banking and communication application, e.g., UICC, eUICC, SSP, software profiles and SSP bundles.

However, as mentioned, the subset of personalization data UPD (e.g., unpredictable personalization data) is not stored in the integrated circuits 60' through step 230. It is noted that in the case predictable personalization data PD are not present/to be stored (i.e., there are only unpredictable personalization data UPD to personalize the cards), the integrated circuits 60' from step 230 contains only static images SI with the operating system and other software (e.g., applications).

Figure 3A:
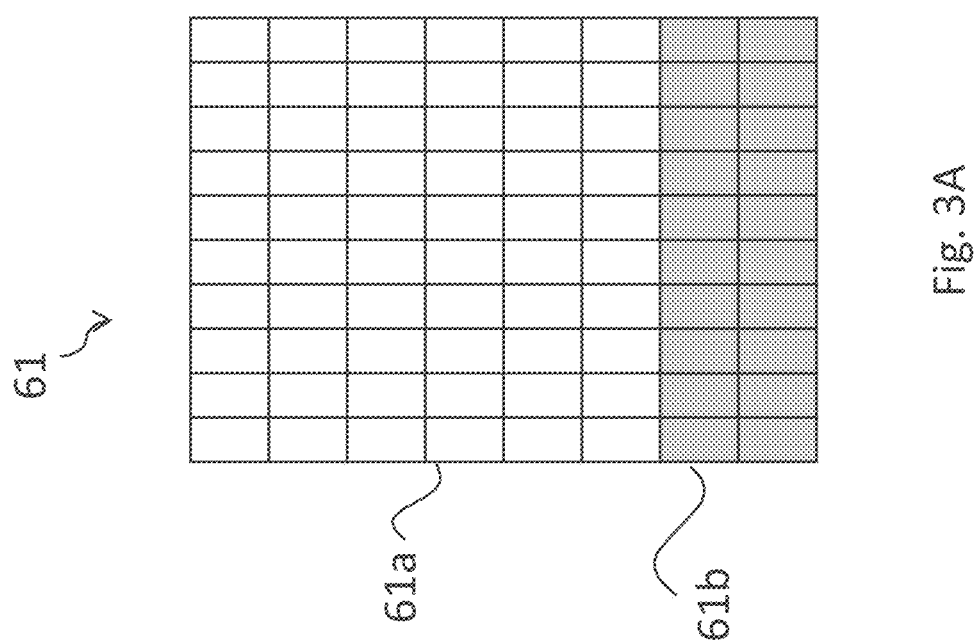
Figure 4:
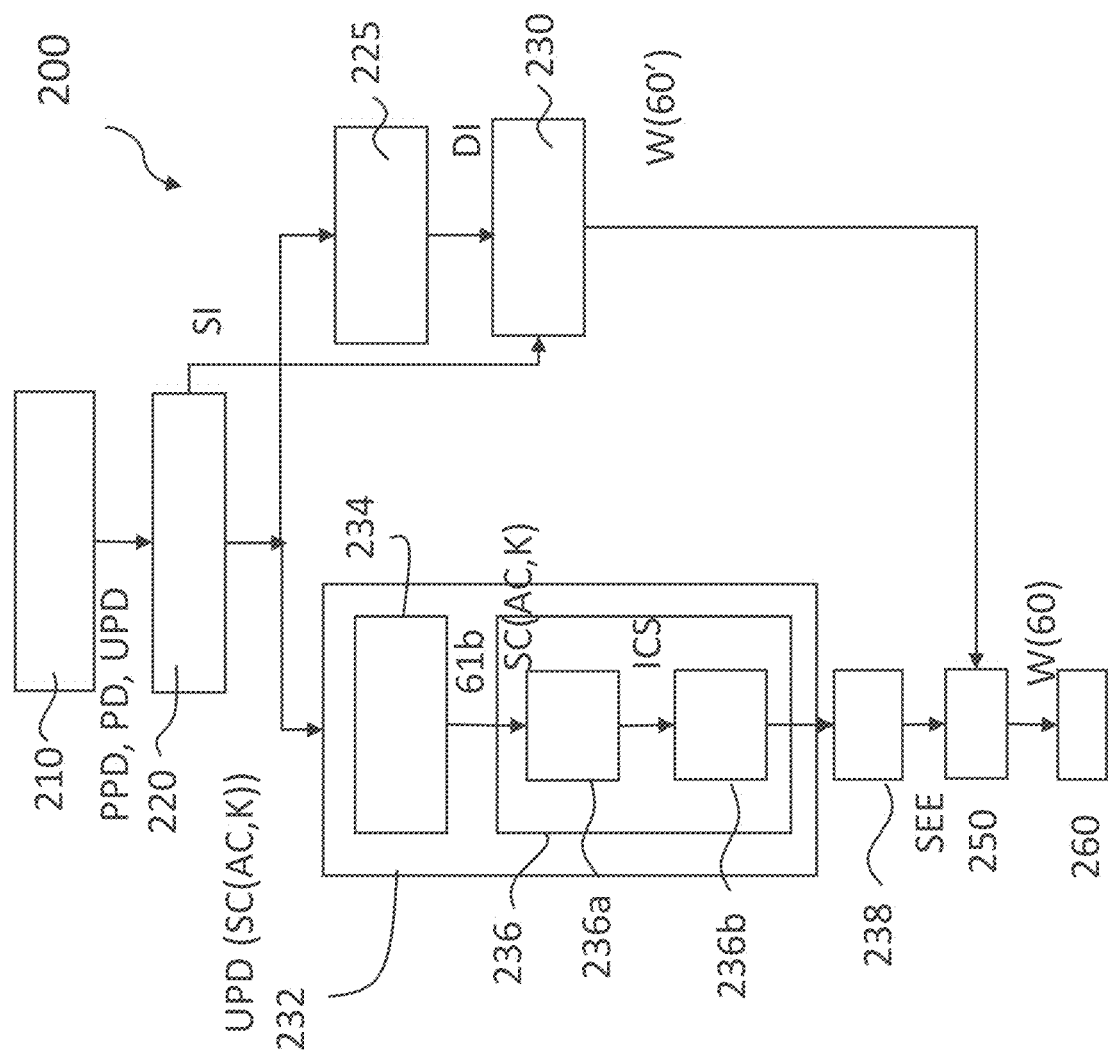
FIG. 4 shows a diagram flow illustrating an embodiment of the method described here.
Figure 5:
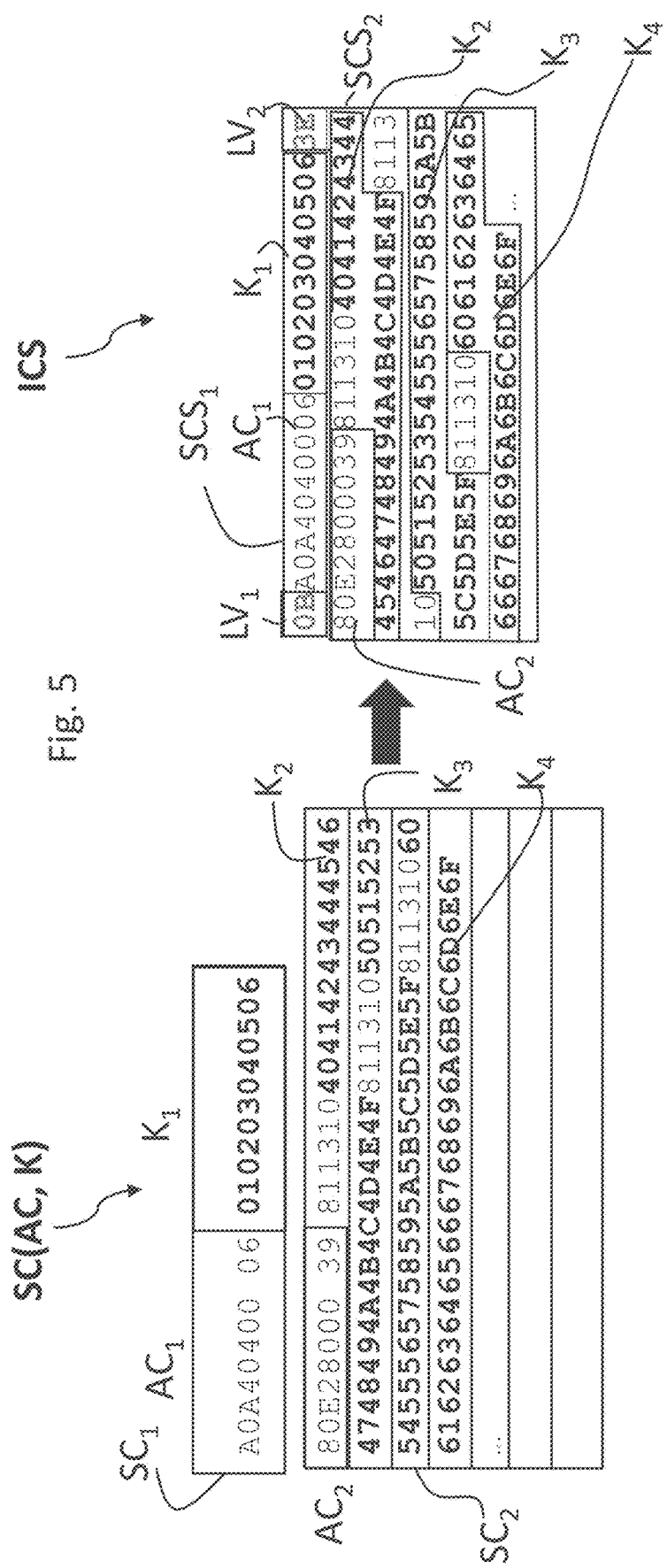
FIG. 5 shows a schematic representation of an encoding operation of an embodiment of the method described here.

To store the unpredictable personalization data UPD in the final integrated circuit card 60, which is operative with all the necessary personalization data (e.g. crypto keys), stored in the required locations of the memory of the card, after step 220 the unpredictable personalization data UPD, which includes a sequence of commands, specifically of APDUs, including commands, in particular in the example APDUs, AC (a sequence SC may include one or more APDU AC as exemplified with reference to FIG. 5) and unpredictable personalization data values K (see FIG. 5) are sent to an operation 232, described with reference to FIGS. 3A and 3B showing schematically a non-volatile memory 61 of an integrated circuit card 60 in two different sub-steps of operation 231, of storing 212 the subset of unpredictable personalization data UPD in the non-volatile memories 61 of a plurality of integrated circuits 60 by reserving 234 an area 61b of the non-volatile memory 61 for the subset of unpredictable personalization data UPD (as depicted in FIG. 3A), storing 236 sequences of commands SC(K), in particular APDU, configured to perform the writing of respective unpredictable personalization data values K in such subset UPD by corresponding applications stored in the integrated circuit card 60, such operation of storing commands 236 including converting 236a the sequence of commands SC(AC,K) by a known coding, for instance a length value (LV) coding, obtaining an inner command script ICS including such sequence of commands SC encoded therein (as a coded sequence of commands SCS, as shown in FIG. 5), and storing 236b such inner command script ICS in the area of the non-volatile memory 61b for such unpredictable personalization data UPD.

In embodiments, method 200 then includes providing, specifically in the example storing 238 in the non-volatile memory 61, in particular in an area 61a which is not reserved to unpredictable personalization data UPD and their sequence of commands SC, a decoding software circuit SEE, which is a script execution unit, in particular an application or an applet, which is configured to decode such inner command script ICS, e.g. decode the length value coding, obtaining the sequence of commands SC, in particular APDU, configured to perform the writing of the unpredictable personalization data values K and to execute such sequence of commands SC. As mentioned, in variant embodiments, operation 238 may include instead of storing it in the area 61a, providing a decoding software circuit SEE separated with respect to the integrated circuit 60 (e.g., a companion circuit).

Therefore, at a subsequent activation of the integrated circuit by the decoding software circuit, the method 200 includes performing an operation 250 of decoding and executing such inner command script ICS with respect to the integrated circuit card 60' including at least the static image SI as outputted by operation 220 or the static image with personalization data images DI from operation 230, and including stored the third-party applications or other application which operation with respect to the personalization data is unknown.

Operation 250 determines, as mentioned, that the sequences of commands SC of subset UPD when executed make the corresponding third party applications or applets or the operative system, identified in such APDUs, access the corresponding unpredictable personalization data values K, that the applications then may store or install in the locations of the static memory SI which are required by the applications themselves, without need for the Chip Manufacturer 53 to know such locations prior the activation of the integrated circuit cards 60.

Therefore, the unpredictable personalization data values K are generated internally to the IC card at the first activation and stored, according to mechanisms that can be ignored by the Chip Manufacturer 53.

With 260 is indicated an optional operation of deletion of the software circuit SEE or of the inner command script ICS to free some memory in the non-volatile memory 61. As mentioned in FIG. 3A is shown as memory 61 after the reservation step 234 with the reserved area 61b of the non-volatile memory 61 for the subset of unpredictable personalization data UPD, while in FIG. 3B it is shown as memory 61 after step 238 (i.e., with the software circuit SEE) and inner command script ICS (i.e., sequence of encoded commands SCS(K)), stored. With step 260 the reserved area 61b of the non-volatile memory may be freed of such software and data, SEE, ICS, and become available as the unreserved area 61a for storing other software and circuits.

In FIG. 5 is exemplified at step 236 of encoding of the sequence of commands SC as inner command script ICS. A sequence of commands SC including a first command $SC_1$ and a second command $SC_2$ is shown. The first command, $SC_1$ is an APDU, in particular a SELECT APDU, $AC_1$ which operates on one personalization data value $K_1$. Then a second commands $SC_2$ include an APDU, $AC_2$, in particular a STORE DATA APDY, which operates on three personalization data values $K_2$, $K_3$, $K_4$.

For instance, the APDU $AC_1$ is 'A0A40400 06' (where 06 indicates a field length before the TLV encoded data) while the corresponding personalization data values $K_1$ is '010203040506'. The command $SC_2$ includes the APDU, where $AC_2$='80E2800 39', with respective personalization data values $K_2$='04142434445464748494A4B4C4D4E4F', $K_3$='50515253545556575859 5A5B5C5D5E5F', $K_4$='606162636465666768696A6B6C6D6E6F'.

It has to be specified that in the example shown the personalization data values before applying the length value encoding 236, in the sequence of commands SC (AC, K) are already TLV (Tag Length Value) encoded, as prescribed for instance by the "GlobalPlatform Card Specification" for the data field of APDUs. For instance, '811310' in the command $SC_2$ is part of the TLV encoding of the personalization data $K_2$ (i.e., '81131004142434445464748494A4B4C4D4E4F' is a structured data which includes the personalization data $K_2$ with the TLV encoding).

As shown, the length value encoding 236 transforms the sequence of commands SC, in a string where coded commands SCS1 and SCS2 are queued one after the other, each containing commands SC1 and SC2, preceded by the length value LV1 and LV2, and with the respective personalization data value $K_1$ or $K_2$, $K_3$, $K_4$, in particular TLV encoded.

The resulting command script ICS in the example is '0BA0A40400060102030405063E80E28000398113104041424344454645474849 4A4B4C4D4E 4F81131050515253 54-55565758595A5B5C5D5E5F81131060616263646566 6676-8696A6B6C6D6E 6F . . . ' with LV1=0B, LV2=3E.

Other encoding forms besides LV encoding may be used to obtain the inner script ICS from the sequence of commands SC, for instance, a coding according to the specification 3GPP TS 51.013 V17.0.0 (2022-04), in particular as defined in Annex B "Script file syntax and format description», pages 464-466.

Figure 6:
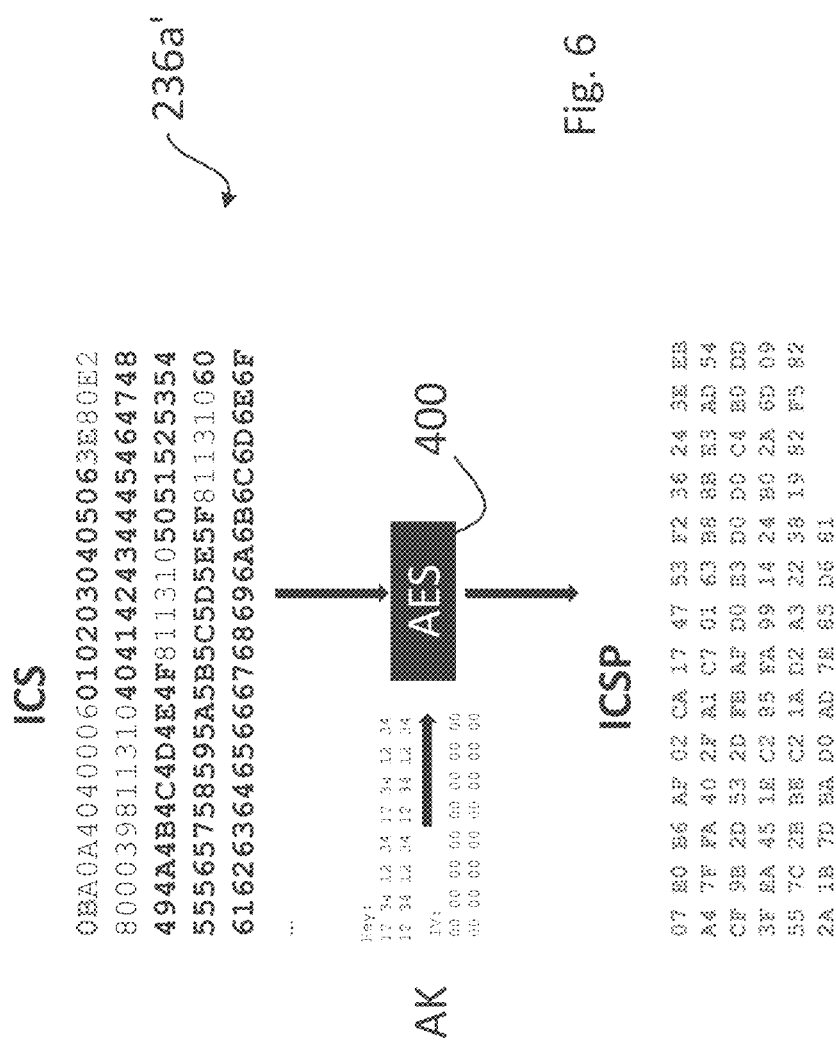
FIG. 6 shows a schematic representation of an optional encryption operation of an embodiment of the method described here.

In FIG. 6 it is schematized as an optional protection step 236a', which may occur after step 236a of the generation of the inner command script ICS. To avoid the personalization data values K, conveyed by the script inner command script ICS, being present in plaintext, a protection mechanism can be applied, such as encryption, for instance, AES encryption 400 applied to the entire inner command script ICS. The circuit SEE is then further configured to perform AES decryption, before decoding, e.g., LV decoding the inner command script ICS and then executing it. The AES protection key AK used by the AES process may be diversified between the secure elements as a conventional/predictable Personalization Data PD.

In variant embodiments, ECC (Error Correction Code) for protection may be applied in a similar way to encryption.

In variant embodiments, also compression techniques, such as zipping may be applied to the inner command script ICS, although in this case, resources have to be allocated for the decompression/unzipping.

In variant embodiments, the decoding software circuit SEE may be a companion circuit, i.e., not stored in the non-volatile memory but available as a side circuit (e.g., available to the manufacturer as a discrete circuit), although this would mean that the circuit is not ready just after switch on (i.e., activation).

In variant embodiments, Memory Images may be sent as batches to circuits 53/54, or singularly via OTA (Over the Air) provisioning to each device (e.g., mobile equipment).

Of course, without prejudice to the principle of the invention, the details of construction and the embodiments may vary widely with respect to what has been described and illustrated herein purely by way of example, without thereby departing from the scope of the present invention, as defined by the ensuing claims.

The method here described in particular can be applied to the introduction of personalization data in integrated circuits for smart cards like UICC, eUICC, and iUICC, but also in variant embodiments to integrated circuits for other devices such as Secure Elements, NFC (Near Field Communication) tags, SSP, which have a non-volatile memory to be programmed with personalization data.

The method here described in particular can be applied to the introduction of personalization data pertaining to profiles in smart card or software bundles.

Also, while a preferred embodiment provides that the integrated circuits are produced by a WLCSP, Wafer Level Chip Scale Packaging so that the method of introduction of personalization data here described can be performed while the integrated circuit is still on the wafer, and then it is cut and possibly soldered on a plastic support or in place in a device, however, the method here described can be applied also to an integrated circuit already separated by the wafer, in particular already mounted on the support or embedded in a device.

What is claimed is:

1. A method, comprising:
    writing a static data image in an invariant part of a non-volatile memory of an integrated circuit card used to store an operating system;
    writing a set of personalization data in the static data image representing data specific to the integrated circuit card;
    storing a subset of the set of personalization data in a reserved area of the non-volatile memory by storing commands for writing the set of personalization data by an application or the operating system;
    converting the commands with a known code to obtain an inner command script, the inner command script including the commands as encoded;
    storing the inner command script in the reserved area of the non-volatile memory;
    decoding and executing the inner command script to obtain the commands during an activation of the integrated circuit card; and
    executing the commands by the integrated circuit card.

2. The method of claim 1, wherein the integrated circuit card is a secure element.

3. The method of claim 1, wherein the commands are Application Protocol Data Unit (ADPU) type commands.

4. The method of claim 1, further comprising reserving the reserved area of the non-volatile memory.

5. The method of claim 1, wherein the decoding and executing of the inner command script is performed by an application, and wherein the application is stored in the non-volatile memory.

6. The method of claim 5, wherein the method further comprises deleting the application after decoding and executing the inner command script.

7. The method of claim 1, wherein the known code is a length value coding.

8. The method of claim 1, wherein the subset of the set of personalization data is a subset of unpredictable personalization data having an unknown location or coding.

9. The method of claim 1, further comprising, in response to the set of personalization data having a subset of predictable personalization data with known static data image location, known code, or both:
    storing the predictable personalization data by a substitution technique; and
    writing the subset of predictable personalization data as images in the static data image at the known static data image location and with the known code.

10. The method of claim 1, further comprising:
    encrypting the inner command script using an Advanced Encryption Standard (AES) encryption before storing the commands; and
    decoding the decrypted inner command script.

11. The method of claim 10, wherein a protection key of the AES encryption is a predictable personalization data accessible to an application used to decode and execute the inner command script.

12. The method of claim 1, wherein the static data image corresponds to a non-volatile memory image, a smart secure platform (SSP) bundle, or an integrated circuit card software profile.

13. A non-transitory computer-readable media storing computer instructions that when executed by a processor, cause the processor to:
    write a static data image in an invariant part of a non-volatile memory of an integrated circuit card used to store an operating system;
    write a set of personalization data in the static data image representing data specific to the integrated circuit card;
    store a subset of the set of personalization data in a reserved area of the non-volatile memory by storing commands for writing the set of personalization data by an application or the operating system;
    convert the commands with a known code to obtain an inner command script, the inner command script including the commands as encoded;
    store the inner command script in the reserved area of the non-volatile memory;
    decode and execute the inner command script to obtain the commands during an activation of the integrated circuit card; and
    execute the commands by the integrated circuit card.

14. The non-transitory computer-readable media of claim 13, wherein the computer instructions when executed by the processor, cause the processor to:
    encrypt the inner command script using an Advanced Encryption Standard (AES) encryption before storing the commands; and
    decode the decrypted inner command script.

15. The non-transitory computer-readable media of claim 13, wherein the static data image corresponds to a non-volatile memory image, a smart secure platform (SSP) bundle, or an integrated circuit card software profile.

16. The non-transitory computer-readable media of claim 13, wherein the computer instructions when executed by the processor, cause the processor to, in response to the set of personalization data having a subset of predictable personalization data with known static data image location, known code, or both:
    store the predictable personalization data by a substitution technique; and
    write the subset of predictable personalization data as images in the static data image at the known static data image location and with the known code.

17. The non-transitory computer-readable media of claim 13, wherein the decoding and executing of the inner command script is performed by an application, and wherein the application is stored in the non-volatile memory.

18. The non-transitory computer-readable media of claim 13, wherein the computer instructions when executed by the processor, cause the processor to delete the application after decoding and executing the inner command script.

19. An integrated circuit card comprising a non-volatile memory, the integrated circuit card configured to:
    write a static data image in an invariant part of a non-volatile memory of the integrated circuit card used to store an operating system;
    writing a set of personalization data in the static data image representing data specific to the integrated circuit card;
    store a subset of a set of personalization data in a reserved area of the non-volatile memory by storing commands for writing the set of personalization data by an application or the operating system;

convert the commands with a known code to obtain an inner command script, the inner command script including the commands as encoded;

store the inner command script in the reserved area of the non-volatile memory;

decode and execute the inner command script to obtain the commands during an activation of the integrated circuit card; and execute the commands by the integrated circuit card.

20. The integrated circuit card of claim 19, wherein the integrated circuit card is produced in accordance with Wafer Level Chip Scale Packaging (WLCSP) techniques.

* * * * *